Oct. 7, 1958 L. G. GITZENDANNER ET AL 2,855,572

SCANNING APPARATUS

Filed Oct. 1, 1945 2 Sheets-Sheet 1

Inventors:
Louis G. Gitzendanner,
Charles J. Falk,
by Merton D. Morse
Their Attorney.

SCANNING APPARATUS

Filed Oct. 1, 1945 2 Sheets-Sheet 2

Inventors:
Louis G. Gitzendanner,
Charles J. Falk,
by Merton D. Moore
Their Attorney.

2,855,572

SCANNING APPARATUS

Louis G. Gitzendanner and Charles J. Falk, Schenectady, N. Y., assignors to General Electric Company, a corporation of New York Application October 1, 1945, Serial No. 619,716

9 Claims. (Cl. 333—24)

This invenion relates to electrostatic apparatus for scanning a plurality of sources of relatively weak electric signals and is an improvement upon the invention disclosed and claimed in an application Serial No. 619,725 filed concurrently herewith in the names of Robert B. Crandell, Henry C. Maulshagen and Billy R. Shepard and assigned to the same assignee as the present invention.

In electrostatic scanning apparatus such as that disclosed in the above Crandell et al. application it is essential that cross talk or interference between the signals from the several sources be minimized. For this reason various arrangements have been provided for reducing coupling between adjacent signal conductors. Furthermore, when weak signals are supplied to the apparatus it is essential that there be minimum attenuation of the signals within the apparatus. Accordingly it is in object of this invention to provide an improved electrostatic scanning device for scanning a plurality of signal sources with minimum cross talk and interference.

It is another object of the invention to provide a device for scanning a plurality of signal sources including an improved arrangement for capacitively coupling the signal sources to a common signal amplifier in a predetermined order and with minimum attenuation of the signals and minimum cross talk between adjacent signal conductors.

Figures 1, 2, 3:
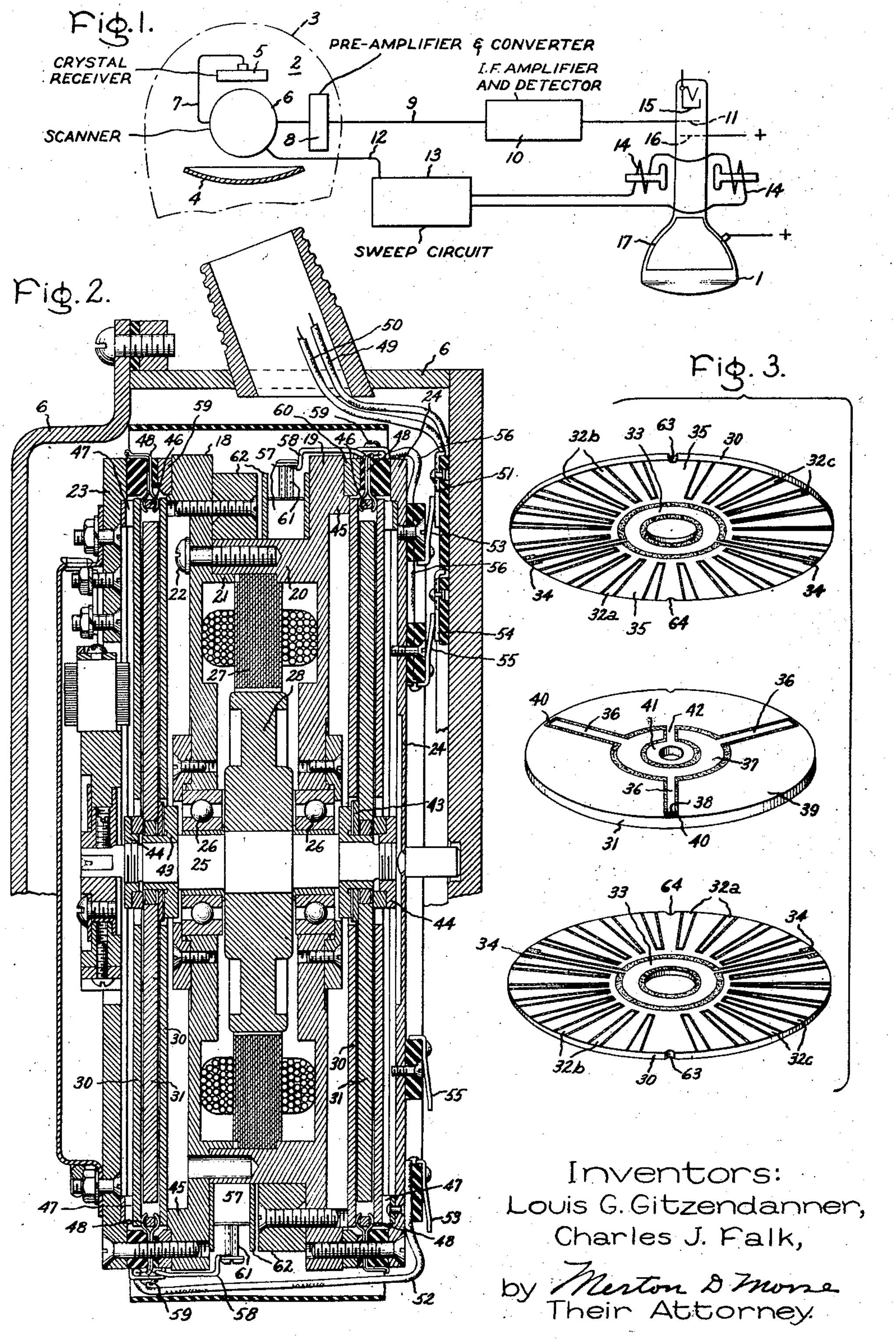
Figures 4, 5:
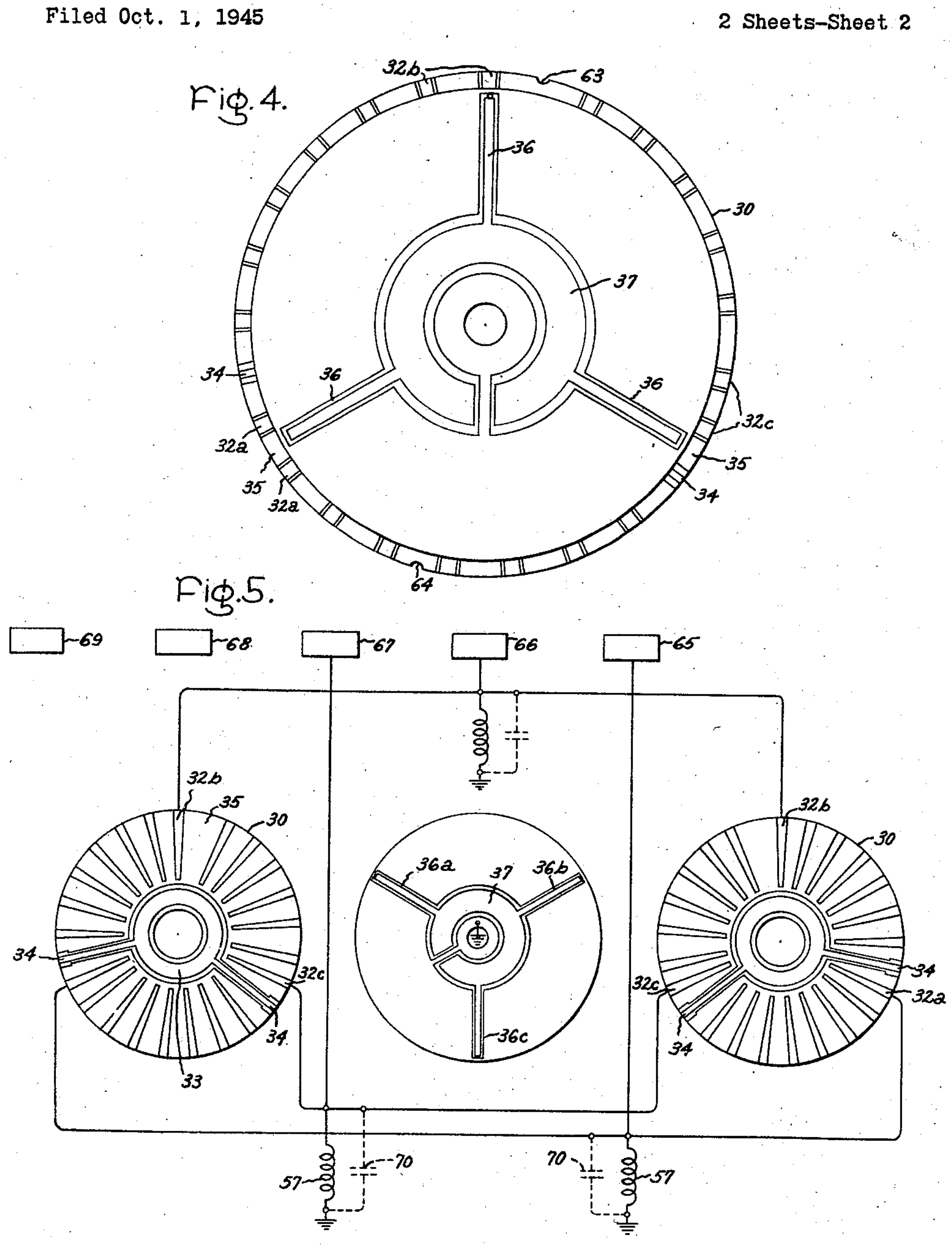

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing in which Fig. 1 represents diagrammatically a signal receiving and portraying apparatus utilizing a scanning device embodying the invention; Fig. 2 is a detailed sectional view of the scanning device with a portion of the housing removed; Fig. 3 is an exploded perspective view of the scanning plates employed in the device of Fig. 2; Fig. 4 is a view of one of the stationary plates with the rotating plate in position thereover; and Fig. 5 is a diagrammatic view of the circuit connections of the scanning plates.

Referring now to Fig. 1, a cathode ray tube 1 is arranged to portray signals received by a receiving apparatus generally indicated at 2. The apparatus illustrated is of a type employed to receive underwater sound signals and comprises a waterproof casing indicated by a broken line 3 which is streamlined in form and arranged to be suspended under water from a suitable vessel. The receiving apparatus 2 includes a parabolic sound reflector 4 and a receiving transducer 5 mounted for rotation with the reflector 4 within the casing 3. The apparatus is keyed or otherwise arranged to receive signals from an area in front of the casing during a predetermined number of degrees of each revolution of the receiver. The transducer 5 is provided with a row or line of piezoelectric crystals and is arranged in front of the reflector so that the crystals lie in a line approximating the focal curve of the reflector and which line lies in a common plane with the axis of rotation. The crystals receive signals corresponding to a plurality of angles of declination in a plane cutting through the volume of water under examination. For example, if the movement of the receiver about its axis of rotation represents azimuthal movement over the volume under examination, the line of crystals represents a series of declination angles over a portion of a vertical plane extending radially from the receiver transversely of the volume under examination. By scanning the line of crystals rapidly as the receiver is rotated, it is possible to examine a succession of vertical planes over the entire volume. In order to scan the crystals successively and rapidly a motor driven electrostatic scanner arranged in a waterproof casing 6 is mounted in the receiver assembly; the scanner is connected to the crystals in the housing 5 through a cable or conduit 7 containing separate concentric cables the central conductors of which are connected to respective ones of the individual crystals and the outer conductors of which are grounded. The operation of the scanner supplies the signals from the crystals successively to an electronic preamplifier and converter 8 which is also a part of the rotating receiver assembly. The signals are amplified successively by the amplifier 8 and are converted to a different frequency and transmitted along a cable 9 from the housing 3 to an amplifying and detecting apparatus 10. The detected signals are then impressed on a control grid 11 of the cathode ray tube 1 to control the intensity of the electron beam of the tube. There is also included in the scanner housing 6 a device for producing synchronizing pulses indicating the position of the scanner with respect to the line of receiving elements in the transducer 5, and these synchronizing pulses are supplied through a conductor 12 to a suitable sweep circuit 13 which energizes a pair of deflection coils 14 for sweeping the beam in the cathode ray tube in synchronism with the scanning of the crystals. The cathode ray beam in the tube 1 is produced in the usual manner by operation of a heated cathode 15, a first anode 16 and a second anode 17. Because the receiver is rotated during the receiving of the signals it is necessary to represent this rotation on the screen of the cathode ray tube; this is accomplished by rotating the deflecting coils 14 in synchronism with the rotation of the receiver so that the rotation of the beam causes the visual signals on the screen to appear in positions corresponding to the positions of the receiver. The operation of the apparatus produces a shadowgraph of any object in the area or field of view under examination and indicates the approximate size and shape of the object. The signal portraying system diagrammatically shown in Fig. 1 is more fully described and is claimed in application Serial No. 619,720 filed concurrently herewith in the names of Cramer W. La Pierre et al. and assigned to the same assignee as the present invention.

In apparatus such as that shown in Fig. 1, supersonic sound vibrations are received by the transducer 5; these vibrations are echoes reflected from objects in the path of a transmitted sound wave. These sound echoes are usually very weak and the corresponding electric currents set up by vibration of the crystals in the transducer 5 are extremely small. By providing a scanner of the electrostatic type, such as that disclosed in the aforesaid Crandell et al. application, it is possible to pick up and amplify the weak sound signals with minimum interference noise. In the scanner shown in the drawings cross talk between elements is further reduced and the signals are picked up effectively with minimum attenuation and minimum noise interference.

The details of construction of the scanning device are clearly shown in Fig. 2. The scanner includes a metal casing comprising two cylindrical boxes or cases 18 and 19 arranged back to back and spaced apart by an annular flange 20 formed on the back of the case 19 inwardly of the periphery thereof. The flange 20 fits over a thin locating flange 21 on the case 18 and is secured to that case by a plurality of screws 22. The cases 18 and 19 are closed by cover plates 23 and 24, respectively, and a motor shaft 25 is mounted in ball bearing assemblies 26 in the back walls of the cases. The motor includes a stator 27 and a rotor 28 mounted within the space formed by the flange 20 between the cases 18 and 19, the rotor being secured for rotation with the shaft 25.

Two similar scanning devices, one for high frequency and one for low frequency, are mounted within the cases 18 and 19, respectively. These scanner assemblies are of the same construction and corresponding parts have been designated by the same numerals. The two scanners are arranged to be employed with two different lines of crystals in the receiver 5, one a line of high frequency crystals and the other a line of low frequency crystals. More crystals are required for the high frequency line than for the low frequency line and consequently more conducting elements are required in the scanners; however, the scanners are otherwise of identical construction.

Each of the scanners comprises a pair of stationary members or plates 30 and a rotatable member or plate 31. A plurality of pairs of conducting elements are provided on the stationary plates, the elements of each pair being on opposite plates. Each of these pairs of elements is connected to an individual crystal, and the rotating plate 31 is provided with conducting arms which pass between the pairs of elements on the stationary plates and couple each corresponding crystal capacitively to the amplifier 8. The scanner plates 30 and 31 are constructed of glass or other suitable hard insulating material, and the conducting elements and arms may be formed on the plates by any suitable method which provides a durable and smooth conducting coating.

The arrangements and details of the conducting plates and elements on the insulated scanning plates 30 and 31 are clearly shown in Fig. 3. Each of the plates 30 is provided on one side with a plurality of conducting elements or fingers 32 arranged in three groups and designated **32*a*, 32*b*, and 32*c* in the respective groups. The fingers 32 extend radially from the edge of the plate toward the center; and the length of each finger is approximately two-thirds of the radius of the plate. Around the center of the plate and spaced therefrom is an annular conducting plate or ring 33 connected to two conductor strips 34 which extend from the ring 33 to the edge of the plate. The area of the plate 30 between the ring 33, the fingers 32 and the conductors 34 is covered with conducting areas or plates 35 which are spaced and insulated from the remaining conducting areas and may be connected to ground or some other point of suitable reference potential. The rotating plate 31 is provided with identical conducting areas on both sides thereof, one side being clearly shown in Fig. 3. The plate 31 is provided with three pairs of arms 36 extending radially from annular plates or rings 37 on the two sides of the plate 31 and which are complementary to the rings 33 on the plates 30. One of the pair of conducting arms 36 on opposite sides of the plates is conductively connected by a contact member or coating extending through an opening 38 in the plate at the end of the arms of the pair. The areas 39 between the three arms 36 on the plate 31 are covered with conducting material and are connected together by strips 40 of conducting material at the edge of the plate beyond the ends of the arms 36. The areas 39 are insulated from the arms 36 and from the ring 37 by being spaced therefrom and are connected to a central ring 41 by a strip 42 extending through the ring 37 which is provided with an open gap for this purpose. The ring 42 is connected to ground by being clamped between a conducting washer 43 and a nut 44 on the shaft 25, so that the areas 39 of the plate 31 are maintained at ground potential. As shown in Fig. 2 the inner plate 30 of each pair rests against an annular shoulder 45 on its respective case 18 or 19. A spacing ring 46 of insulating material is arranged between the plates 30 of each pair near their outer peripheries and the outer plate 30 is pressed against the spacing ring 46 by a plurality of springs 47 mounted on the inner face of the plates 23 and 24, respectively. This mounting of the plates 30 maintains accurate alignment so that the plates 31 rotate between the plates 30 with fixed close spacing on both sides of the plates 31. In the drawing, the spacing rings 46 are shown in section at positions where they are notched to receive conducting clips 48 for connecting the individual signal sources to the several fingers 32 and to the conductors 34. The clips 48 are bifurcated and surround the reduced portions of the ring 46 and extend slightly beyond the sides of the ring until the plates are pressed together and force the two prongs of each of the clips 48 against the fingers 32 on both plates. Each clip thus connects the opopsitely facing fingers of each respective pair of fingers. The spacing between the plates 30 of each pair is, however, determined by the full thickness of the ring 46** between the reduced portions of the ring where the clips are connected.

The concentric conductor leads for connecting the crystals in the transducer 5 to the fingers 32 pass through the conduit 7; two of these leads are shown in Fig. 2 at 49 and 50, the lead 49 being connected to a crystal in the high frequency line in the transducer, and the lead 50 to a crystal in the low frequency line. All the high frequency leads 49 are connected to a ring of contacts 51 secured to and insulated from the inside of the back plate of the housing 6. Each pair of fingers 32 on the left-hand or high frequency scanner is connected through its clip 48 and a lead 52 to a spring contact 53 mounted on the back plate 24; and when the scanner is in position in the housing 6 the spring contacts 53 engage respective ones of the contacts 51 and connect the scanner fingers to their respective crystals. The leads 50 are connected to the fingers 32 of the right-hand or low frequency scanner in a similar manner by contacts 54 on the housing 6 through spring contacts 55 and leads 56. Only one each of the leads 52 and 56 has been illustrated in order to avoid complication of the drawing.

It has been found that the capacity effects due, for example, to the stray capacity between ground and the leads 49 and 50 and other conductors connected to each of the pairs of fingers 32 may result in noise or interference or unequal attenuation of signals between the transducer and the scanner. In order to neutralize or balance out these capacity effects each of the pairs of finger 32 of both scanners is connected through its clip 48 to an iron core inductance coil in a plug 57 through a conductor 58; each conductor 58 is soldered to a clip 48 anchored by a screw 59 to one of two insulated rings 60 forming extensions of the cases 18 and 19 against which the covers 23 and 24 are secured. The lead 58 is connected to one terminal of the inductance coil in the plug 57 by a removable cap 61. The other terminal of the inductance coil is connected to the ground metal plug casing which is frictionally held in one of two metal rings 62 which extend around the outside of the flange 20 and are provided with holes for receiving the inductane plugs. The inductance coil is thus connected between ground and the clip 48 so that it can be selected of a size to balance out the stray capacitance to ground. The size of the inductance is selected so that it neutralizes the capacity to ground at the terminals 48 and minimizes the attenuation of the signals coming from the transducer.

In order to minimize cross talk between adjacent signal sources the pairs of fingers 32 are arranged on the plates 30 so that adjacent pairs of fingers are not connected to adjacent signal sources but instead adjacent crystals are connected to pairs of fingers in different groups in three sections of the plate which are roughly equal in size. As shown in Fig. 3 the group of fingers **32*a* lies in a section of the plate between the two strips 34, the group of fingers 32*b* in a section between the left-hand strip 34 and a locating notch 63, and the group of fingers 32*c* in a section between the notch 63 and the other strip 34. In the plates illustrated there are eight pairs of fingers 32*a* and seven each of the pairs of fingers 32*b* and 32*c*. The notches 63 and similar notches 64 at the opposite sides of the plates are provided for locating the plates in their correct positions in the scanner and for preventing rotation or movement from their required locations. The fingers in each group are spaced equally and are at the same spacing as the fingers in the other groups. The arrangement of the fingers in the several groups is such that as the arms 36 rotate only one of the three arms can be in direct capacitive coupling relation with any pair of fingers at a time, the other two arms lying in the neutral areas between portions of the grounded plate 35 when one arm is directly between a pair of fingers. The manner in which this is accomplished may be understood more readily from Fig. 4 where the arm 36 at the top of the figure has been shown lying directly over one of the fingers 32*b*. Now, assuming that the arm rotates in a counterclockwise direction, the arm 36 on the righ-hand side of the figure is below the first finger 32*c*, so that this arm will move over that finger when the top arm 36 leaves the finger 32*b* over which it is positioned in the figure. The third arm on the left-hand side has passed the first finger 32*a* and is over a grounded area 35 and will reach the second finger 32*a* only after the right-hand arm 36 has moved away from the first finger 32*c*. It will thus be apparent that the scanner as shown in Fig. 4 is arranged so that the three arms successively scan individual fingers 32 in each of the three groups of fingers. By connecting three adjacent crystals in the transducer to the three fingers 32** which are about 120 degrees apart, it is thus possible to scan adjacent crystals with minimum danger of cross talk which might be caused by simultaneous coupling of two adjacent fingers.

The manner in which the fingers 32 are connected to the crystals is clearly indicated in Fig. 5 where a series of crystals numbered 65 to 69, inclusive, have been indicated, these being five of the crystals in one of the lines of crystals in the transducer 5. The crystal 65 has been shown connected to the first pair of elements **32*a*, the connecting terminal being grounded through an inductance coil 57 to neutralize the distributed or stray capacity indicated at 70. The crystal 66 has been similarly connected across an inductance 57 to the first pair of fingers 32*b*, and the crystal 67 has similarly been connected to the first pair of fingers 32*c*. For convenience the arms 36 in Fig. 5 have been designated 36*a*, 36*b*, and 36*c*. Assuming now that the arms of the rotor move between the plates 30 so that their movement is counterclockwise with respect to the plate 30 at the left-hand side of Fig. 5, then the arm 36*a* moves downwardly toward the first fingers 32*a*. When the arm is directly over the finger the crystal 65 is coupled through the arm, thence to the plate 37 and capacitively through the plates 33 to the arms 34 and thence to the preamplifier. When the arm 36*a* is in direct capacitive coupling relationship with the first finger 32*a*, the arms 36*b* and 36*c* lie over portions of the grounded areas 35. As the rotating plate continues to move, the arm 36*a* moves out of coupling relationship with the fingers 32*a* and the arm 36*b* moves into coupling relationship with the first pair of fingers 32*b* thereby connecting the crystal 66 to the preamplifier, and on further rotation the arm 36*c* moves into coupling relationship with the first pair of fingers 32*c*. By providing the inductance coils 57, the capacity effects caused by differences in length of the leads, for example, can be neutralized so that any additional length of lead due to the distribution of the scanning fingers about the entire circumference of the plates does not result in increased attenuation for signals conducted to the fingers farthest from the crystals. The arrangement of the inductance coils is simple and compact and makes it possible easily to remove a coil either for servicing or replacement. The arrangement of the conducting fingers 32 so that they can be distributed throughout the entire circumference of the plates makes the connections to the scanner simpler and avoids crowding of connections and of other circuit elements such as the inductance coils 57**.

The scanner plates described above are constructed so that the crystals or other signal sources arranged in a row may be scanned in succession without the necessity of arranging the conducting elements on the scanner close together in positions such that there will be a tendency toward cross talk between adjacent elements.

While the invention has been described in connection with an electrostatic scanning device employed in an underwater object locating apparatus, other applications will readily be apparent to those skilled in the art. It is not, therefore, desired that the invention be limited to the specific construction illustrated and described, and it is intended by the appended claims to cover all modifications within the spirit and scope of the invention.

What we claim as new and desire to secure by Letters Patent of the United States is:

1. A capacitive coupling device for scanning a plurality of signal points comprising two relatively rotatable members, a plurality of spaced conducting elements on one of said members and having faces lying in a common surface of revolution about the axis of relative rotation of said members, said elements being arranged in a plurality of groups each group in a different section of said surface, means for connecting said elements to respective ones of the signal points, a plurality of electrically connected conducting arms on the other of said members equal in number to the number of sections of said surface and closely spaced from said conducting elements for relative rotation at a fixed distance therefrom, said elements being so spaced on said one member that only one of said arms can lie in capacity coupling relationship with one of said elements at a time and so that said arms successively become capacitively coupled with selected ones of said elements in successive ones of said groups, and signal conducting means connected with said arms.

2. A capacitive coupling device for scanning a plurality of signal points comprising two relatively rotatable members, a plurality of conducting elements on one of said members arranged with faces lying in a common surface of revolution about the axis of relative rotation of said members and substantially evenly spaced entirely around said surface, said elements being arranged in a plurality of groups, each group lying in a different circumferential section of said surface and the elements in each of said groups being equally spaced from one another, said spacing of said elements being the same in all said groups, a plurality of equally spaced electrically connected conducting arms on the other of said members equal in number to the number of sections of said surface and closely spaced from said conducting elements at a fixed distance therefrom, said groups of elements being so arranged on said one member that only one of said elements can be in full capacitive coupling relationship with said arms at a given time, whereby said arms successively become capacitively coupled with selected ones of said elements in successive ones of said groups, and signal conducting means connected with said arms.

3. A capacitive coupling device for scanning a plurality of signal points comprising two relatively rotatable plates mounted for rotation at a fixed spacing, a plurality of radially extending conducting fingers on one of said plates, said fingers being arranged in a plurality of groups arranged in different sectors about the axis of rotation of said one plate, the fingers in each of said groups being equally spaced, the spacing of said fingers being the same in all said groups, a plurality of equally spaced electrically connected conducting arms on the other of said plates equal in number to the number of groups of fingers, said groups of fingers being so arranged on said one plate that only one of said fingers can be in full capacitive coupling relationship with said arms at a given time whereby said arms successively become capacitively coupled with selected ones of said elements in different ones of said groups, and signal conducting means connected with said arms.

4. A capacitive coupling device for scanning a plurality of signal sources comprising a support, a stationary member, a rotatable member mounted for rotation on said support at a fixed spacing from said stationary member, a plurality of spaced conducting elements on said stationary member having faces lying in a common surface of revolution about the axis of said rotatable member, said elements being arranged circumferentially substantially around the entire area of said surface, means for connecting said elements to receive signal energy from respective ones of the signal sources, a conducting arm on said rotatable member closely spaced from said conducting elements for rotation in fixed relation thereto, individual inductances mounted on said support and arranged to be connected between respective ones of said elements and a point of fixed reference potential for neutralizing the effect of capacity between the leads to said elements and said point of fixed reference potential, said elements being so spaced on said stationary member that only one of said arms can lie in capacity coupling relationship with any one of said elements at a time, and means for conducting signal energy from said arms during the rotation thereof.

5. A capacitive coupling device for scanning a plurality of signal sources comprising a stationary member and a rotatable member, a plurality of spaced conducting elements on said stationary member and having faces lying in a common surface of revolution about the axis of said rotatable member, said elements being arranged in a plurality of groups each group in a different section of said surface, means for connecting said elements to receive signal energy from respective ones of the signal sources, conducting means arranged between and spaced from said elements on said surface for maintaining the areas of said stationary member between said elements at a fixed reference potential to reduce cross talk between said elements, a plurality of electrically connected conducting arms on said rotatable member equal in number to the number of sections of said surface and closely spaced from said conducting elements for rotation at a fixed distance therefrom, said elements being so spaced on said stationary member that only one of said arms can lie in capacity coupling relationship with one of said elements at a time and so that said arms successively become capacitively coupled with selected ones of said elements in successive ones of said groups, and means for conducting signal energy from said arms during the rotation thereof.

6. A capacitive coupling device for scanning a plurality of signal sources comprising a stationary member and a rotatable member, a plurality of spaced conducting elements on said stationary member and having faces lying in a common surface of revolution about the axis of said rotatable member, said elements being arranged in a plurality of groups each group in a different section of said surface, means for connecting said elements to receive signal energy from respective ones of the signal sources, conducting means arranged between and spaced from said elements on said surface for maintaining the areas of said stationary member between said elements at a fixed reference potential to reduce cross talk between said elements, a plurality of electrically connected conducting arms on said rotatable member equal in number to the number of sections of said surface and closely spaced from said conducting elements for rotation at a fixed distance therefrom, said elements being so spaced on said stationary member that only one of said arms can lie in capacity coupling relationship with one of said elements at a time and so that said arms successively become capacitively coupled with selected ones of said elements in successive ones of said groups, conducting means covering the areas of said rotatable member between said arms for maintaining substantially the entire surface of said rotatable member adjacent said stationary member and between said arms at said fixed reference potential for facilitating the reduction of cross talk between said elements, and means for conducting signal energy from said arms during the rotation thereof.

7. A scanning device of the capacitive coupling type comprising two relatively rotatable members, a plurality of spaced conducting elements on one of said members and having faces lying in a common surface of revolution about the axis of relative rotation of said members, said elements being arranged in a plurality of groups each group in a different section of said surface, a conducting lead for each of said elements, conducting means arranged between and spaced from said elements on said surface for maintaining the areas of said one member between said elements at a fixed reference potential to reduce cross talk between said elements, a plurality of electrically connected conducting arms on the other of said members equal in number to the number of sections of said surface and closely spaced from said conducting elements for relative rotation at a fixed distance therefrom, said elements being so spaced on said one member that said arms successively become capacitively coupled with selected ones of said elements in successive ones of said groups, and signal conducting means connected with said arms.

8. A scanning device of the capacitive coupling type comprising two relatively rotatable members, a plurality of spaced conducting elements on one of said members and having faces lying in a common surface of revolution about the axis of relative rotation of said members, said elements being arranged in a plurality of groups each group in a different section of said surface, a conducting lead for each of said elements, a plurality of electrically connected conducting arms on the other of said members equal in number to the number of sections of said surface and closely spaced from said conducting elements for relative rotation at a fixed distance therefrom, said elements being so spaced on said stationary member that said arms successively become capacitively coupled with selected ones of said elements in successive ones of said groups, conducting means covering the areas of said other member between said arms for maintaining substantially the entire surface of said other member adjacent said one member and between said arms at a fixed reference potential for facilitating the reduction of cross talk between said elements, and signal conducting means connected with said arms.

9. A scanning device of the capacitive coupling type comprising two relatively rotatable members, a plurality of spaced conducting elements on one of said members and having faces lying in a common surface of revolution about the axis of relative rotation of said members, said elements being arranged in a plurality of groups each group in a different section of said surface, a conducting lead for each of said elements, conducting means arranged between and spaced from said elements on said surface for maintaining the areas of said one member between said elements at a fixed reference potential to reduce cross talk between said elements, a plurality of electrically connected conducting arms on the other of said members equal in number to the number of sections of said surface and closely spaced from said conducting elements for relative rotation at a fixed distance therefrom, said elements being so spaced on said stationary member that said arms successively become capacitively coupled with selected ones of said elements in successive ones of said groups, conducting means covering the areas of said other member between said arms for maintaining substantially the entire surface of said other member adjacent said one member and between said arms at the fixed reference potential for facilitating the reduction of cross talk between said elements, and signal conducting means connected with said arms.

References Cited in the file of this patent

UNITED STATES PATENTS

| | | |
|---|---|---|
| 1,671,143 | Campbell | May 29, 1928 |
| 1,812,828 | Gray | June 30, 1931 |